United States Patent [19]

Fisher, Jr. et al.

[11] Patent Number: 4,604,706

[45] Date of Patent: Aug. 5, 1986

[54] APPARATUS FOR FAILURE PREDICTION OF EARTH STRUCTURES

[75] Inventors: Carl Fisher, Jr., Louisville; Charles R. Carrington; George A. Grant, both of Longmont, all of Colo.

[73] Assignee: Integrated Sciences, Inc., Longmont, Colo.

[21] Appl. No.: 508,344

[22] Filed: Jun. 27, 1983

[51] Int. Cl.$^4$ .............................................. G01L 1/26
[52] U.S. Cl. .................................. 364/507; 364/421; 73/786
[58] Field of Search ....................... 364/507, 508, 421; 73/786, 784, 649

[56] References Cited

U.S. PATENT DOCUMENTS

| | | | |
|---|---|---|---|
| 4,184,205 | 1/1980 | Morrow | 364/508 |
| 4,306,291 | 12/1981 | Zilm et al. | 364/421 X |
| 4,408,294 | 10/1983 | Imam | 364/507 X |
| 4,433,581 | 2/1984 | Scott et al. | 364/508 X |
| 4,435,770 | 3/1984 | Shiohata et al. | 364/508 |
| 4,453,407 | 6/1984 | Sato et al. | 364/508 X |
| 4,480,480 | 11/1984 | Scott et al. | 73/786 X |

Primary Examiner—Edward J. Wise
Attorney, Agent, or Firm—O'Rourke & Harris

[57] ABSTRACT

Apparatus is disclosed for failure prediction of earth structures. The apparatus is intrinsically safe with all necessary electronics contained in a portable central unit except for a sensor and a preamplifier which are positioned contiguous to an earth structure to be monitored and are connected through an electrical cable to the central unit. The entire apparatus is powered by a six volt battery power source also contained in the central unit with electrical isolation being featured. The apparatus monitors the selected earth structure and predicts failure through analysis of determined microseismic emissions arising from changes in mechanical loading of the selected earth structure. In the central unit, microseismic emissions from the sensor and preamplifier are continuously received, conditioned and then utilized to form event and energy counts which are supplied to a computer that is controlled in such a manner so as to analyze the incoming data and determine therefrom imminent failure of the monitored earth structure with such detected failure being automatically immediately indicated. The apparatus is particularly useful in harzardous environments and in close proximity to personnel whose safey depends upon the relative stability of the earth structure, and is therefore particularly useful in underground mines to predict earth structure failures such as roof falls.

34 Claims, 22 Drawing Figures

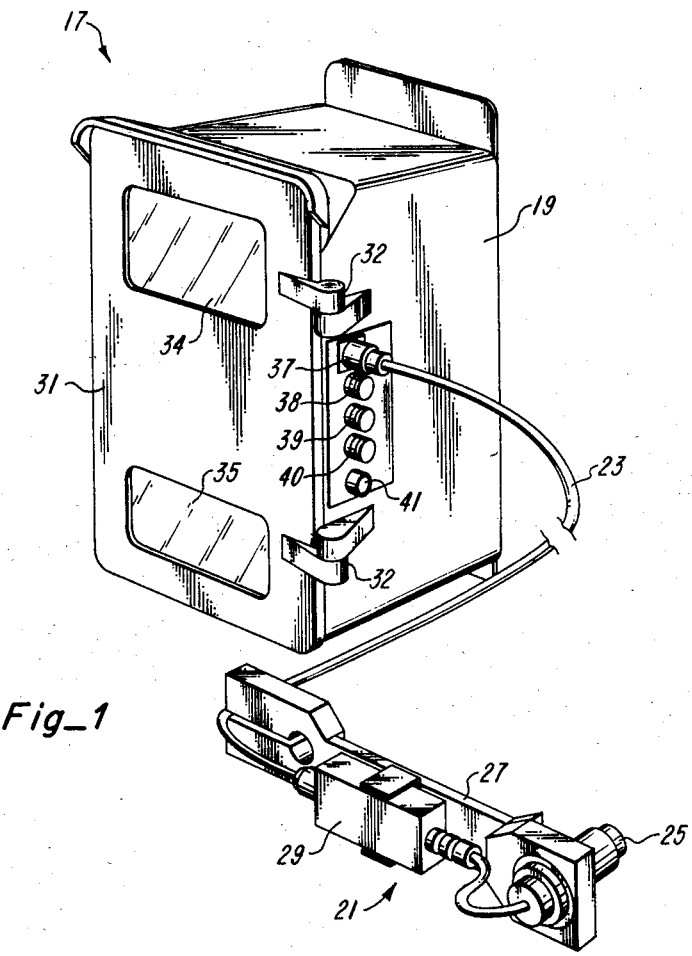
Fig_1

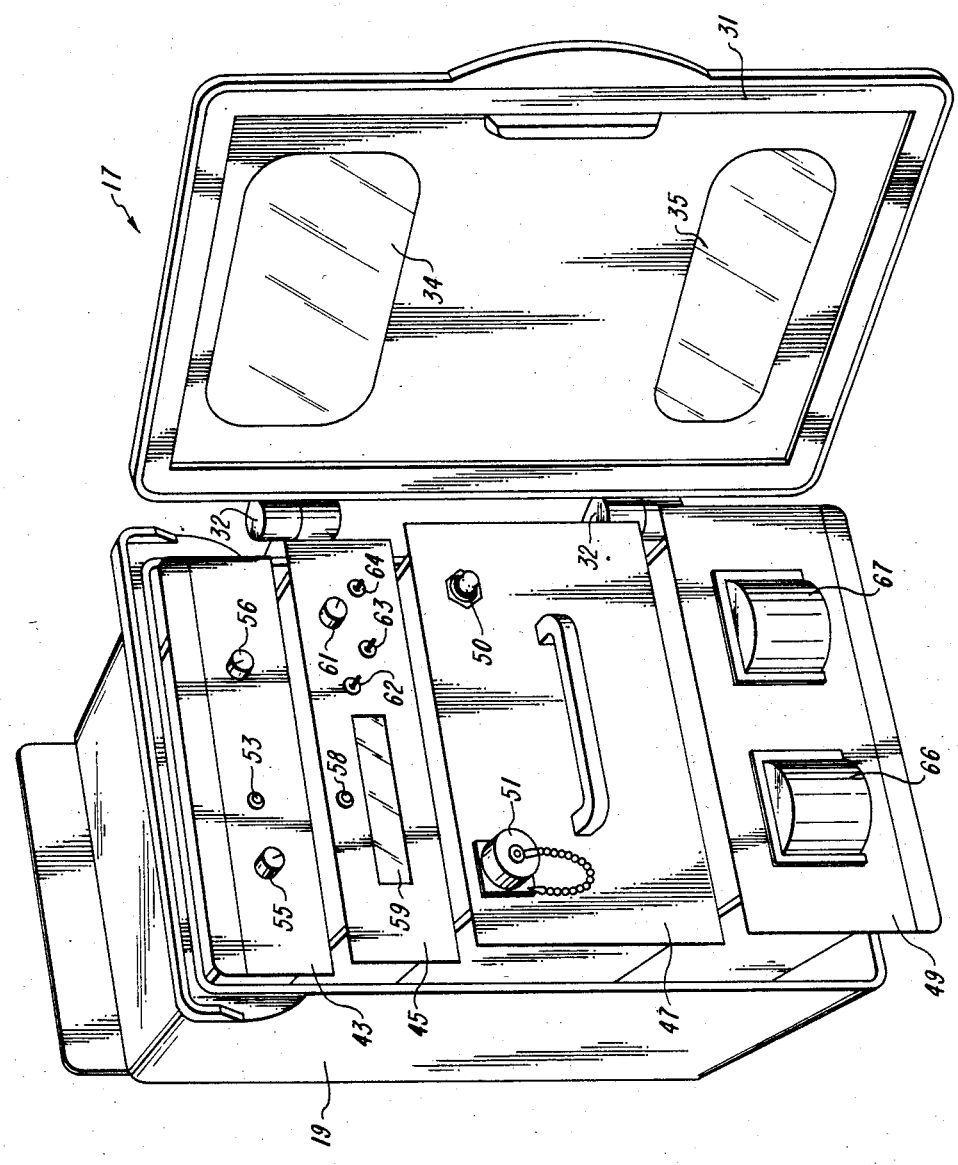
Fig_2

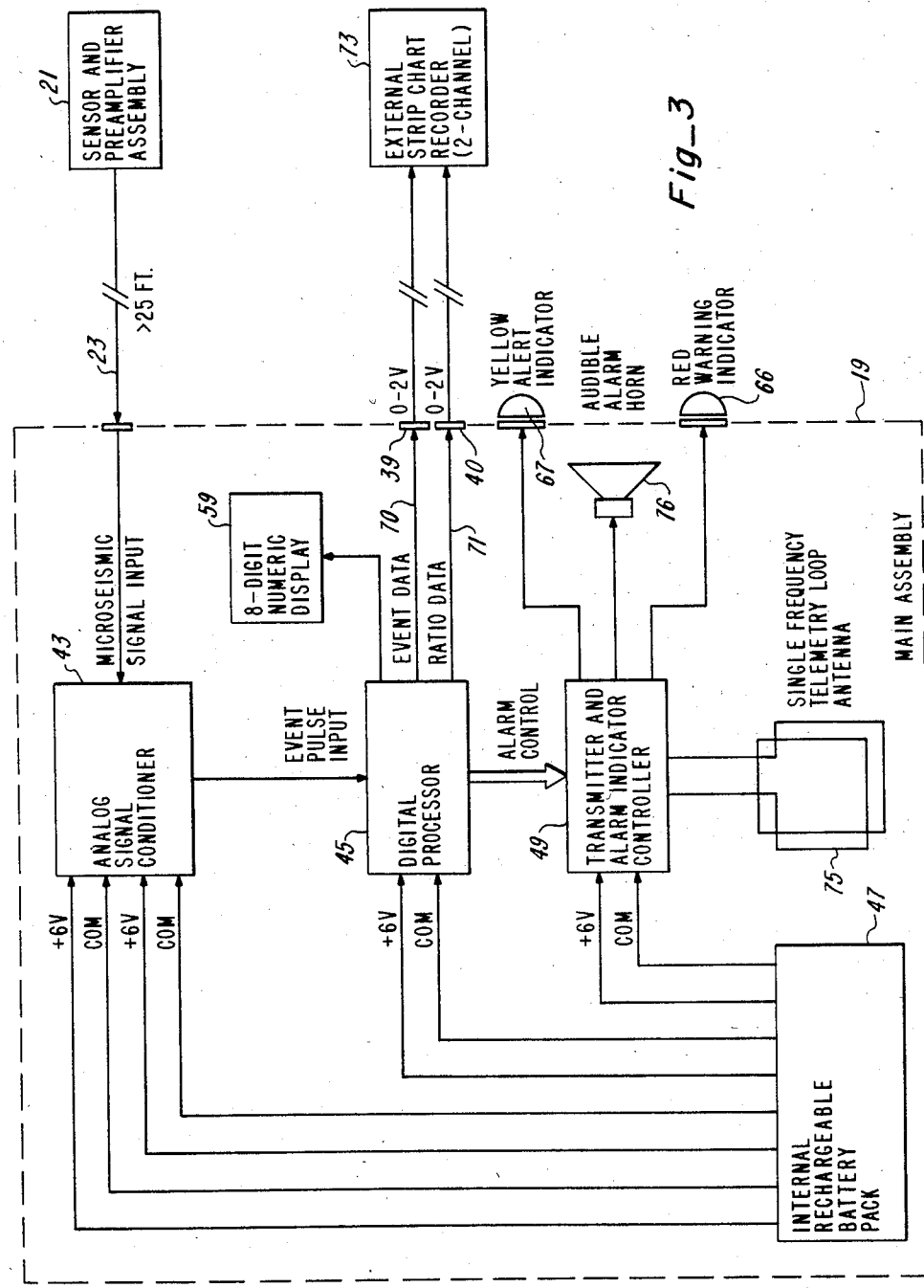

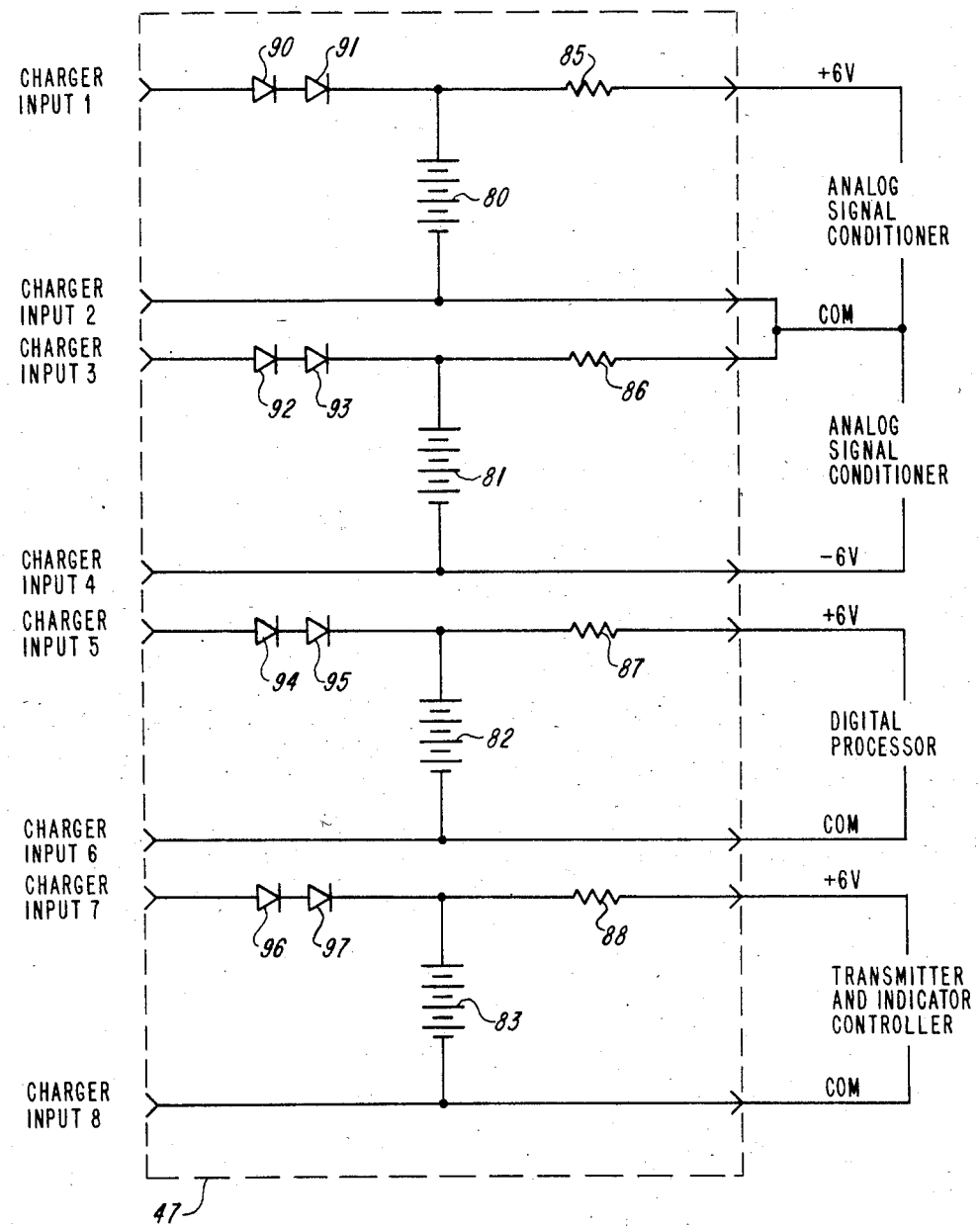
Fig_4

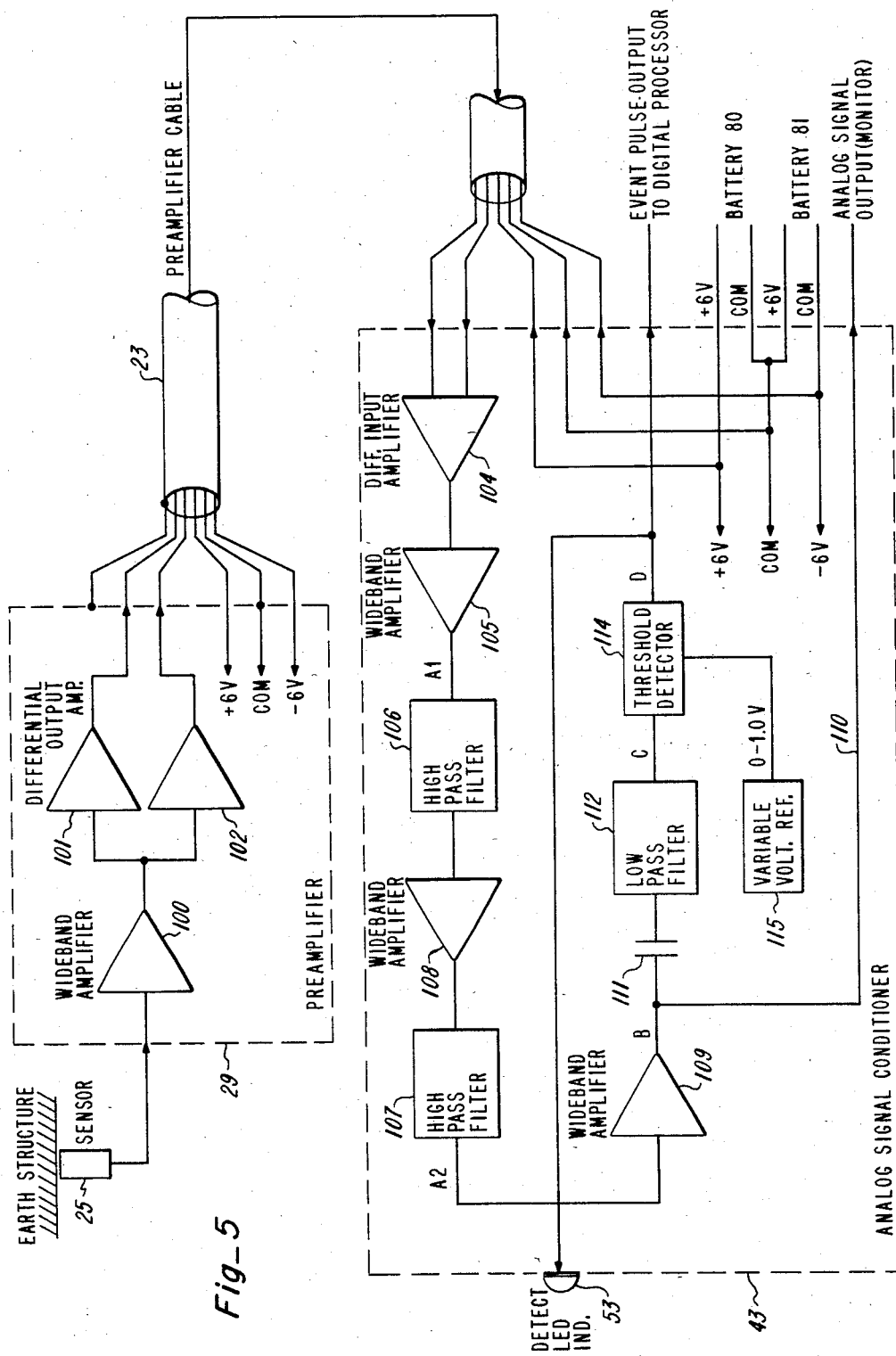
Fig_5

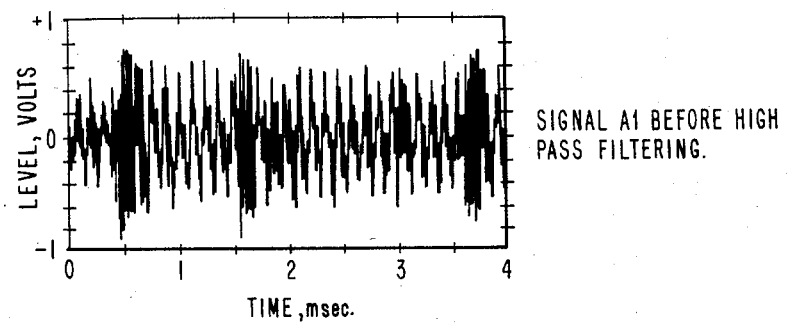
Fig_6a — SIGNAL A1 BEFORE HIGH PASS FILTERING.
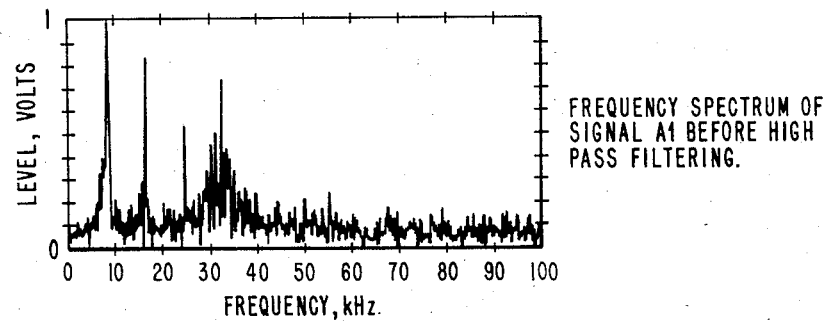
Fig_6b — FREQUENCY SPECTRUM OF SIGNAL A1 BEFORE HIGH PASS FILTERING.
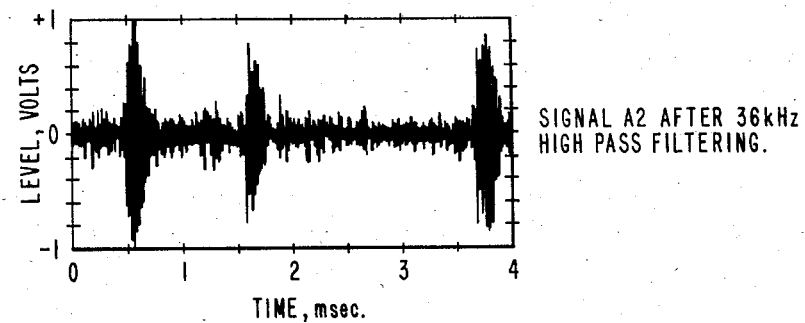
Fig_6c — SIGNAL A2 AFTER 36 kHz HIGH PASS FILTERING.
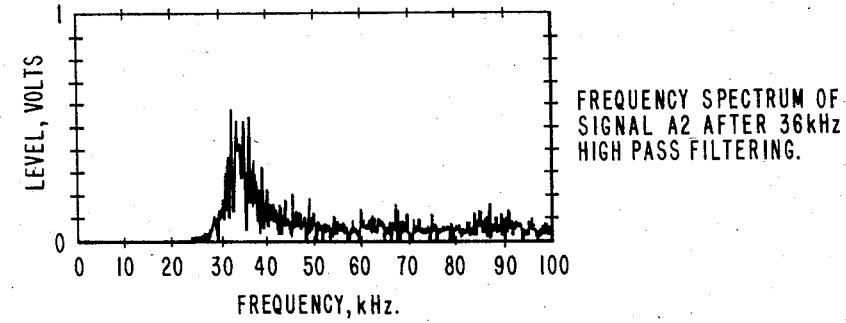
Fig_6d — FREQUENCY SPECTRUM OF SIGNAL A2 AFTER 36 kHz HIGH PASS FILTERING.

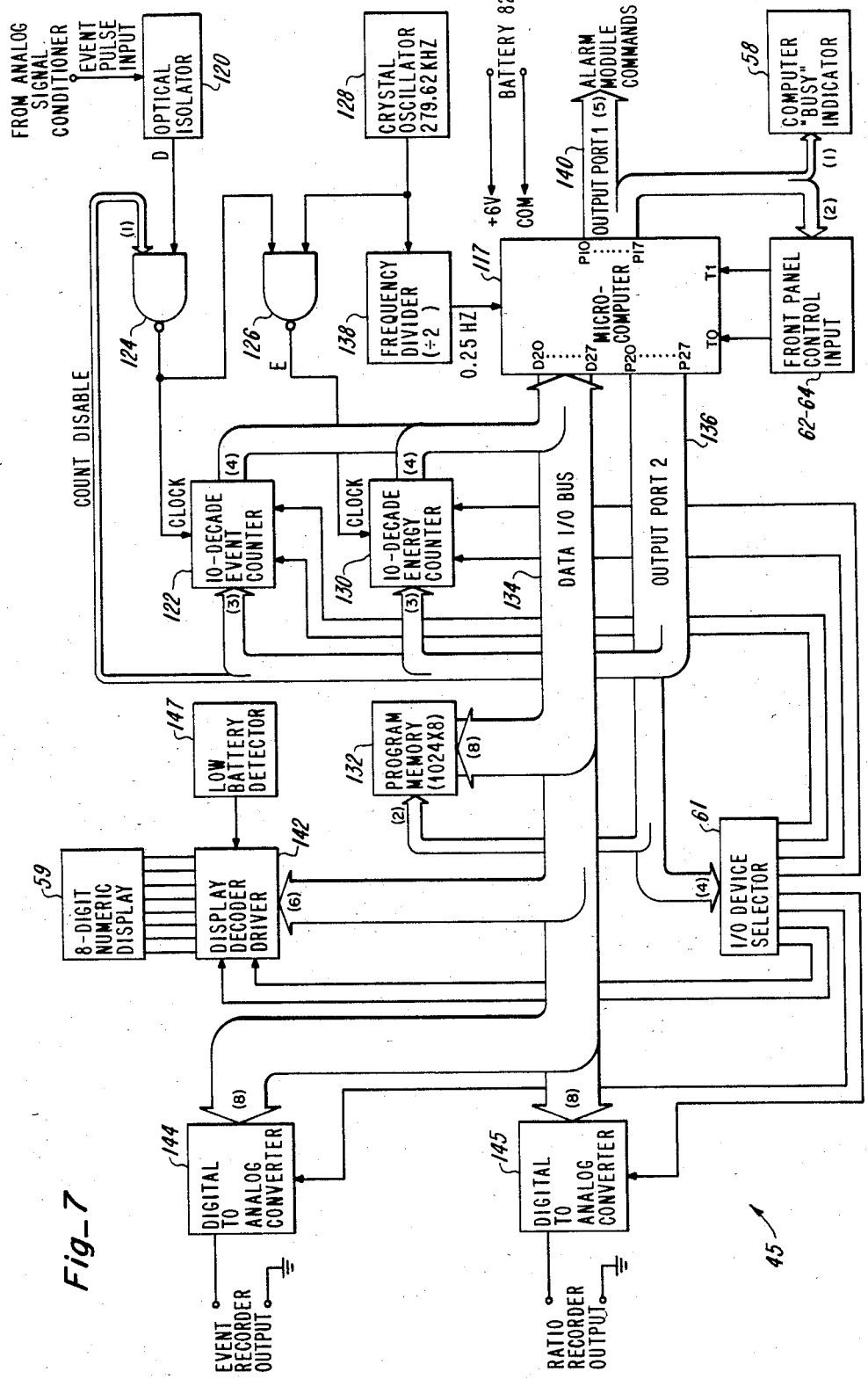
Fig_7

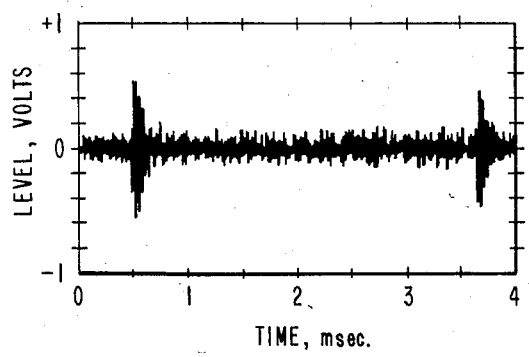
Fig_8a — SIGNAL B
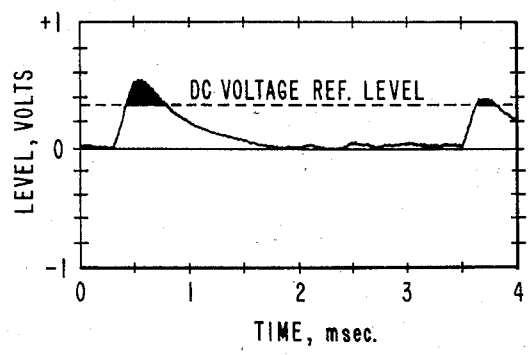
Fig_8b — SIGNAL C
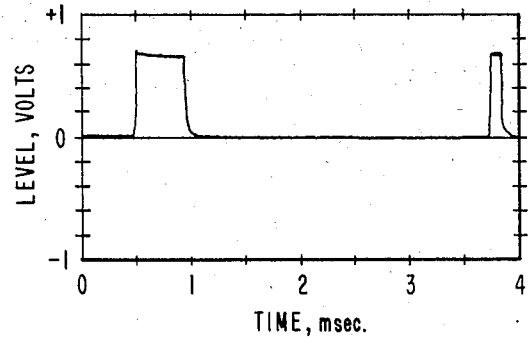
Fig_8c — SIGNAL D
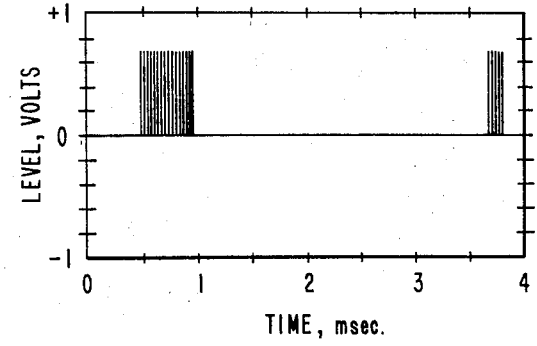
Fig_8d — SIGNAL E

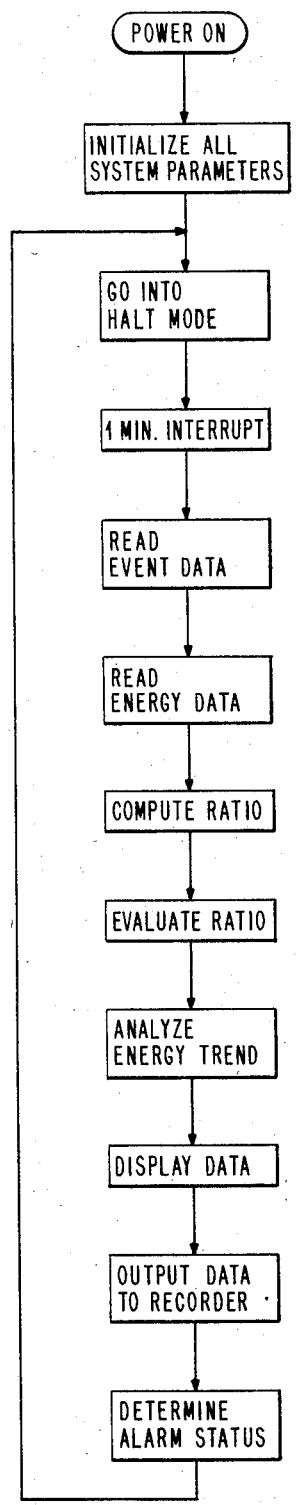
Fig_9

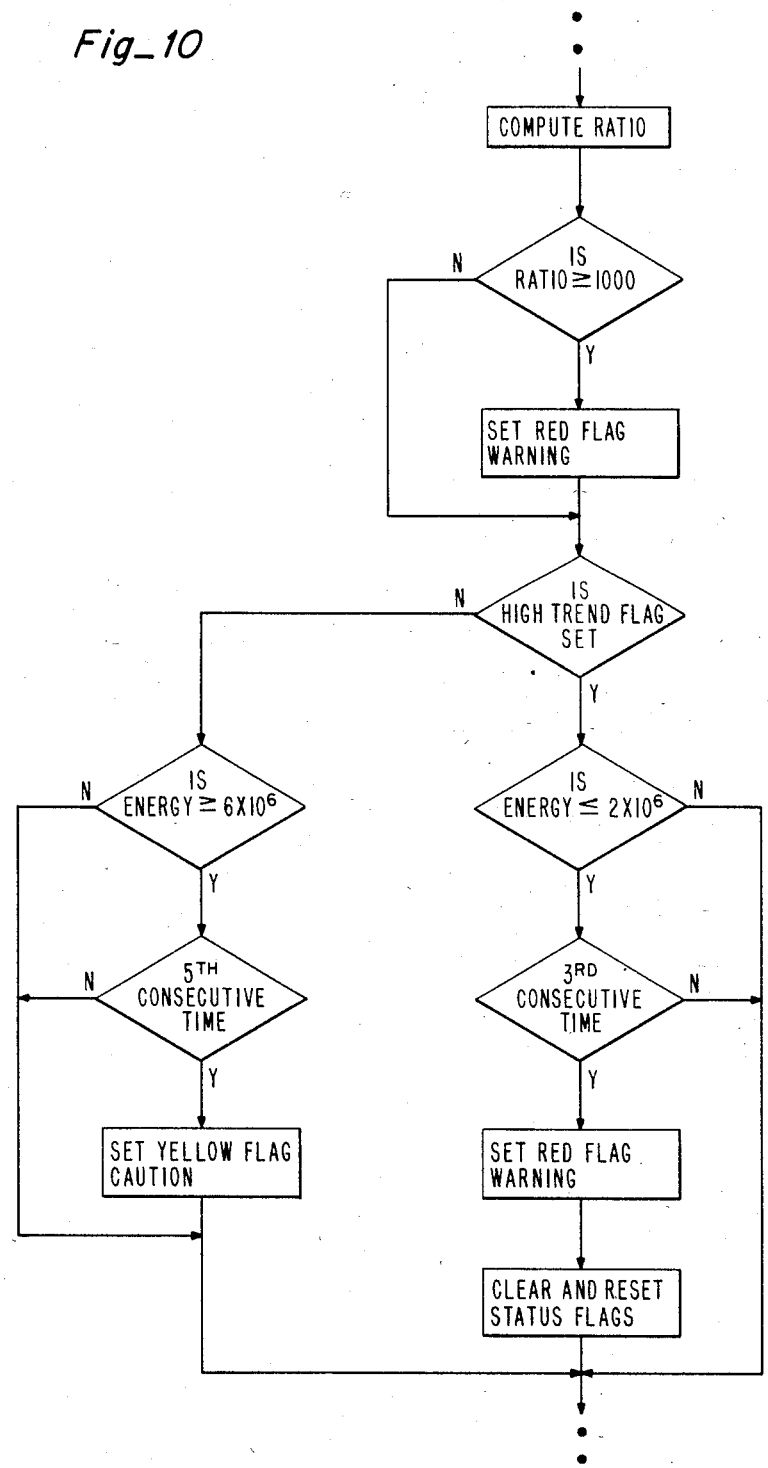
Fig_10

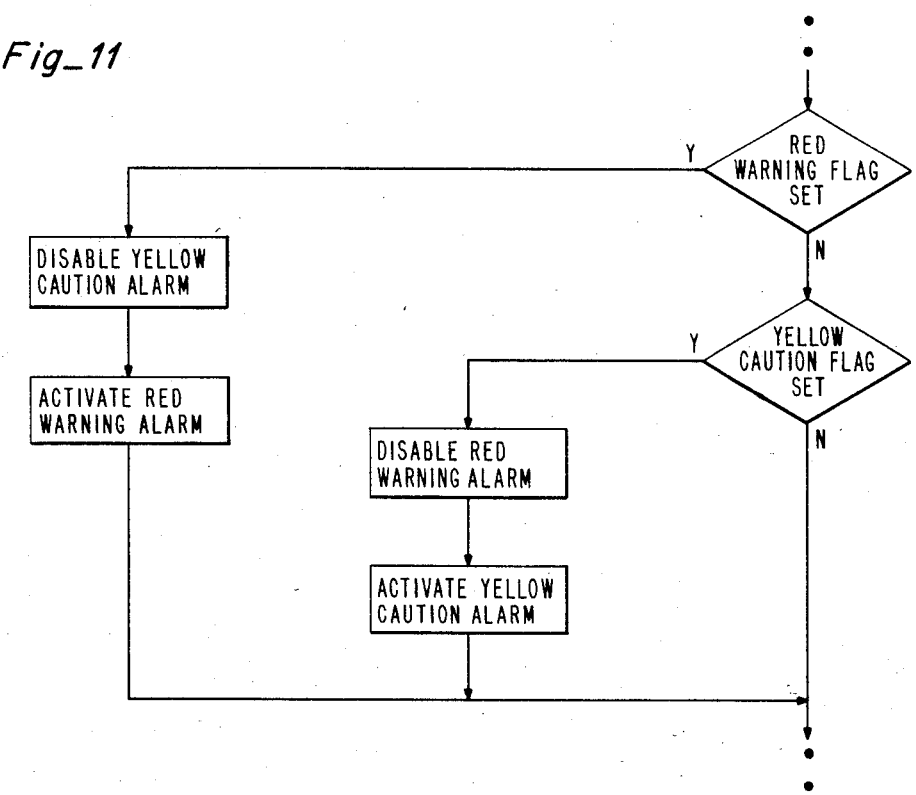
Fig_11
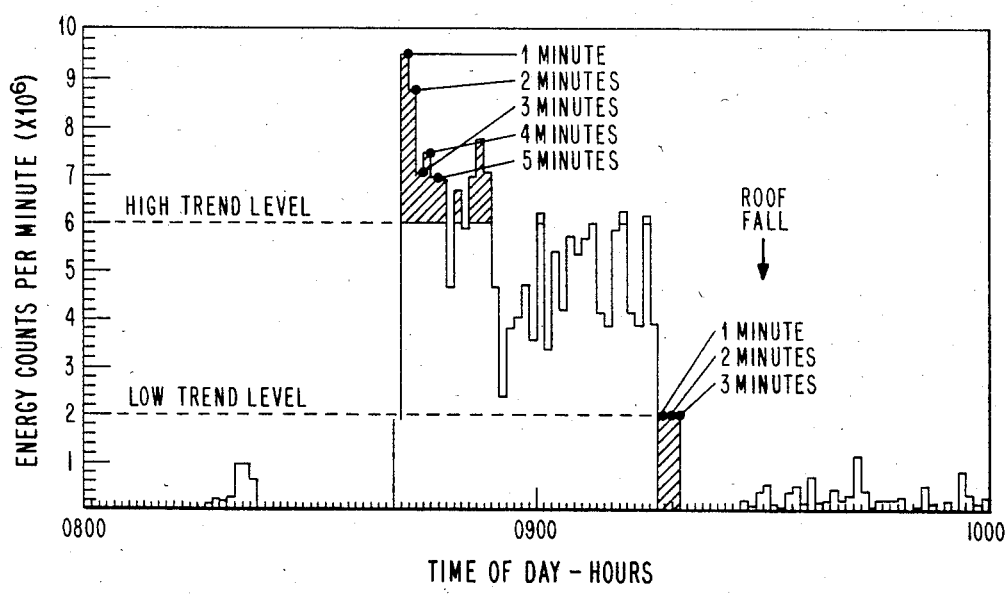
Fig_12

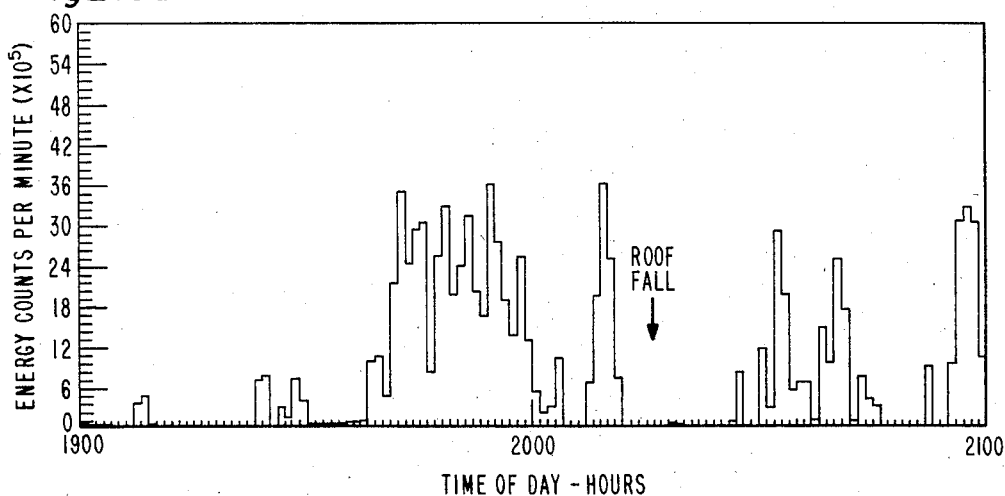
Fig_13a
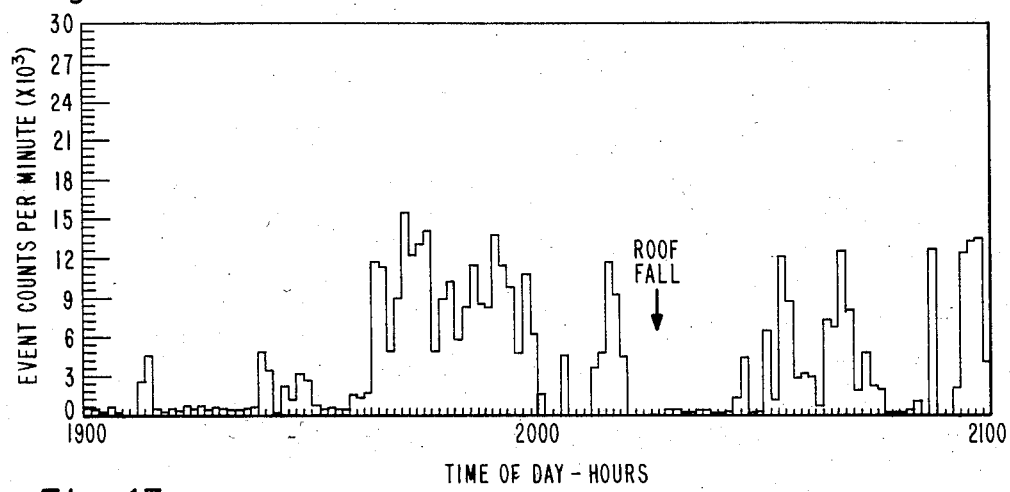
Fig_13b
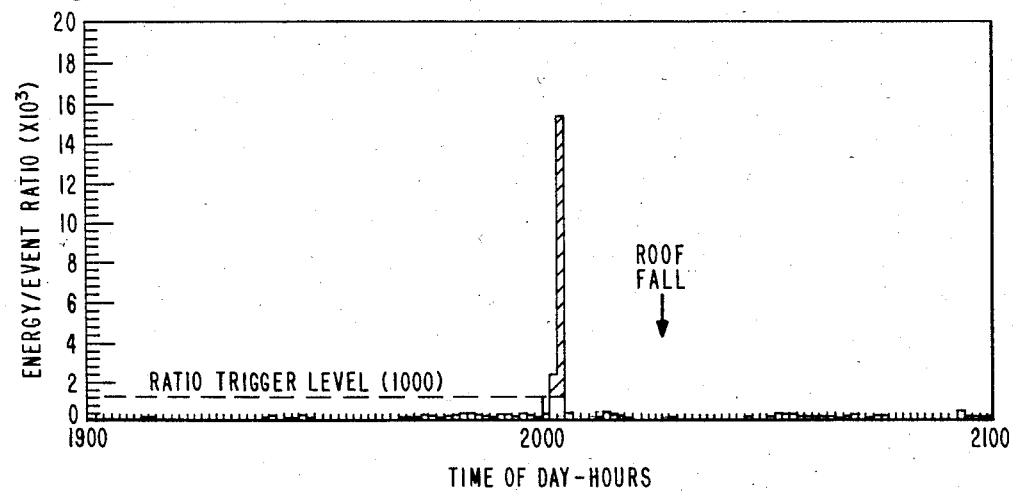
Fig_13c

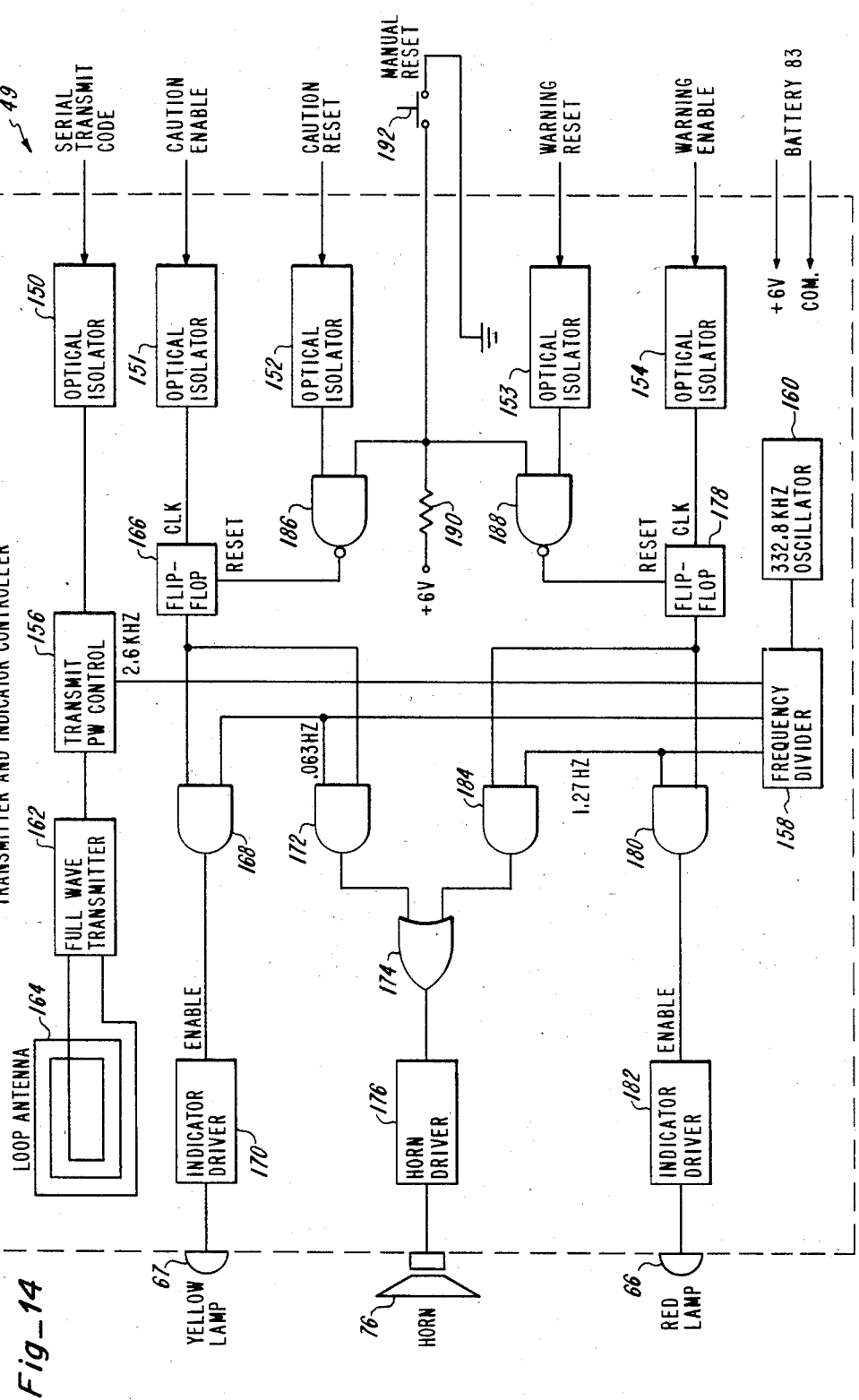
Fig_14

APPARATUS FOR FAILURE PREDICTION OF EARTH STRUCTURES

GOVERNMENT SUPPORT

This invention resulted from contract work funded by the Bureau of Mines, U.S. Department of Interior, in addition to the support provided by the Bureau of Mines in house research if any, and is subject to the provisions of 35 USC Section 202.

FIELD OF THE INVENTION

This invention relates to apparatus for failure prediction of earth structures and, more particularly, relates to portable electronic apparatus for automatically predicting imminent failure of earth structures.

BACKGROUND OF THE INVENTION

Attempts to develop in situ methods of monitoring structural changes and predicting failure in earth structures has been pursued for many years. Methods and devices using low frequency seismic or microseismic techniques have been heretofore suggested and/or utilized but have not produced instruments or systems for predicting structural failure that have proved to be fully satisfactory. These systems typically measured seismic signals in the 0–15 kilohertz frequency range using multi-sensor arrays and processed both seismic event and energy related data as a function of time to determine the specific location of individual failures and the spacial distribution of failures occuring within an earth structure. Using the data obtained in this manner, personnel were then required to analyze whether a potentially larger or more hazardous failure was likely to occur in the near future.

The use of methods or devices employing seismic or microseismic signals in the 0–15 kilohertz range is limited by the problem of discriminating structurally related seismic events from those generated from cultural seismic noise sources such as mining. To partially overcome this problem, such systems now known have evolved into highly sophisticated, complex electronic systems that require highly trained personnel to operate and maintain, and such systems do not predict structural failure, they only provide information derived from the occurrence of structural failures that trained, experienced personnel may use to infer the future occurrence of a potentially more hazardous failure.

Research has been pursued since at least 1974 to develop methods to predict failure in earth structures using techniques for sensing and measuring microseismic signals that are in a frequency range greater than 36 kilohertz (herein termed microseismic emissions). By about May, 1980, prototype research instrumentation had been developed for acquiring microseismic emission data with subsequent analysis of such data indicating that the microseismic emission technique could provide a simple and potentially practical means for predicting failure in earth structures. This instrumentation was, however, not designed to include the data processing capabilities required to automatically predict structural failure and lacked the practical attributes associated with hand portability and simplicity of operation. Such research is reported in "Microseismic Roof Fall Warning System Development", prepared for the United States Department of Interior Bureau of Mines by Integrated Sciences, Inc. of Longmont, Colorado, such report being dated May 30, 1980. In this report, a hand portable prototype roof fall warning system that employed the microseismic emission technique is broadly set forth, but proved to be unsatisfactory for use in the contemplated manner.

SUMMARY OF THE INVENTION

This invention provides an improved apparatus that can be satisfactorily utilized to reliably provide failure predictions of earth structures. A computer is utilized with the computer being programmably controlled in a manner such that sensed imminent earth structure failures are immediately indicated, and the apparatus is portable with power being supplied from a six volt battery source with electrical isolation being featured.

In essence, the apparatus detects microseismic emissions produced by earth structures undergoing changes in mechanical loading, characterizes these emissions in terms of event count, energy count and energy/event ratio data, formats the event count and ratio data for display and recording, analyzes the energy count and ratio data to determine whether structural failure is imminent, and gives audio/visual warning of failure conditions. The entire system is contained within a portable enclosure with the exception of a microseismic emission sensor and preamplifier assembly that is connected to the system through an electrical cable.

It is therefore an object of this invention to provide an improved apparatus for earth structure failure prediction.

It is another object of this invention to provide an improved apparatus for earth structure failure prediction that is portable yet reliable in providing timely warning of earth structure failure.

It is still another object of this invention to provide an improved apparatus for earth structure failure prediction that is programmably controlled in a manner such that timely warning is reliably provided of earth structure failure.

It is yet another object of this invention to provide an improved apparatus for earth structure failure prediction that utilizes a six volt battery source with electrical isolation being provided.

It is still another object of this invention to provide an improved apparatus for earth structure failure prediction that is particularly well suited for use in underground mines.

With these and other objects in view, which will become apparent to one skilled in the art as the description proceeds, this invention resides in the novel construction, combination, and arrangement of parts substantially as hereinafter described, and more particularly defined by the appended claims, it being understood that such changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 1 is a perspective view of the apparatus of this invention for detecting earth structure failures;

FIG. 2 is a second perspective view of the control unit as shown in FIG. 1 with door ajar;

FIG. 3 is a block diagram of the electronics contained in the central unit shown in FIGS. 1 and 2;

FIG. 4 is an electrical schematic diagram of the internal battery pack shown in FIG. 3;

FIG. 5 is a block diagram of the analog signal conditioner shown in FIG. 3;

FIGS. 6a-6d are a series of typical frequency spectra illustrating the cultural noise filtering capability of the analog signal conditioner shown in FIG. 5;

FIG. 7 is a block diagram of the digital processor shown in FIG. 3;

FIGS. 8a-8d are a series of wave forms illustrating electrical signals at selected points in the analog signal conditioner and digital processor shown in FIGS. 5 and 7, respectively;

FIG. 9 is a program flowchart for the microcomputer shown in FIG. 7;

FIG. 10 is a program flowchart of the energy trend and ratio data analysis of FIG. 9;

FIG. 11 is a program flowchart for determining the alarm status of FIG. 9;

FIG. 12 is a chart typically illustrating the energy trend method of failure analysis of FIG. 10;

FIGS. 13a-13c are a series of charts typically illustrating the ratio method of failure analysis of FIG. 10; and FIG. 14 is a block diagram of the transmitter and alarm indicator controller shown in FIG. 3.

DESCRIPTION OF THE INVENTION

The device of this invention, as shown in the drawings, has been used to continuously monitor structural load changes in underground mines and has provided warnings of imminent structural failure with prediction times of five or more minutes. More specifically, it has been used extensively in underground coal mines where portability, battery operation, and U.S. Mine Safety and Health Administration certification for use in gassy mine environments are required.

In use, the device needs only to measure the high frequency microseismic emissions (ME) generated in response to changes in mechanical loading in the mine structure and then processes such information on a minute by minute basis to detect the development of structural instability. The device is able to discriminate and reject the high levels of cultural noise generated by mining machinery and processes and is therefore well suited for use at or near a mine's working face.

To achieve the desired portability, apparatus 17, as shown in FIGS. 1 and 2, includes a central unit 19, a sensing and preamplifier unit 21, and a multi-wire connecting electrical cable 23. Typically, where the apparatus is configured for use in underground mines, the main electronics (or central unit) 19, sensing and preamplifier unit 21, and cable 23 are carried into the underground mine and operated wherever mining personnel are located. Sensor 25 of unit 21 need only be in physical contact with the mine structure for proper operation, and unit 21 includes a mounting assembly 27 which is designed to hold the sensor 25 against the mine roof by allowing easy attachment to a standard roof bolt used extensively in underground mines.

Mounting assembly 27 also has preamplifier 29 mounted thereon. Preamplifier 29 is connected to and powered by the main electronics unit through multiconductor preamplifier cable 23, which cable is preferably twenty-five to five hundred feet in length. This permits placement of the sensor within a twenty-five foot to five hundred foot radius of the main electronics unit 19 as mining progresses during a normal work shift.

If the mine working area is relocated more than allowed by the preamplifier cable, the small, portable main electronics unit 19, weighing less than thirty pounds, may be easily hand carried to a new location.

As shown in FIGS. 1 and 2, central unit 19 (which is preferably a lightweight, high impact resistant, fiberglass enclosure such as made, for example, by Gulton Industries as a BO4400 type enclosure) has a gasketed door 31 which is mounted by hinges 32 to allow the door to be opened for access to the interior of the central unit. As shown, door 31 has two windows 34 and 35 therein for viewing purposes.

As also shown in FIG. 1, cable 23 is connected to central unit 19 at connection 37 at the side of the central unit, and connectors 38, 39 and 40 are also positioned thereat to enable connection of leads (not shown) providing an analog signal monitor output (connector 38), an event counter data output (counter 39), and a ratio data strip chart recorder output (connector 40). An external alarm reset pushbutton control 41 is also provided on the outside of the main electronics unit 19 as shown in FIG. 2. Only the preamplifier cable connection is needed, however, to monitor mine load changes and determine failure conditions. The analog signal monitor output and strip chart recorder outputs are provided to allow use of the device for applications requiring analysis of data such as evaluation of specific mining plans and mine distressing techniques.

As a mine safety instrument, the apparatus of this invention was designed so as to require mine personnel to acknowledge audio-visual alarms before the alarms are turned off. This feature is achieved through the use of the external alarm pushbutton control 41 as the only means of turning off the system's alarms. Once any alarm is automatically activated, the only means of turning the alarm off is by mine personnel manually resetting the alarm via the pushbutton control 41, thereby acknowledging the warning.

All of the basic electronics to measure the microseismic signals, process and analyze data, display data, control alarm indicator, and a power source are contained within hand portable central unit 19 as depicted in FIGS. 1 and 2. Four distinct subassemblies are included in the main electronics unit—analog signal conditioner 43, digital processor 45, battery power pack 47, and alarm indicator/transmitter 49. These units slide into the main assembly preferably using slide rails mounted on an internal metal frame and make electrical connection between individual subassemblies via a printed circuit board mounted at the inside rear of the main unit. Screw type mounting hardware attached to the internal metal frame permit holding the subassemblies firmly in place. Only the battery power pack 47 is mounted using captive type thumb screws to permit easy removal and reinstallation, and battery power pack 47 has an off-on switch 50 located at the front thereof.

As shown in FIG. 2, a removable, rechargable battery pack 47, contained within the main electronics unit, powers the entire system for periods of up to ten days of continuous operation. Since entrance and exit of miners from underground mines normally occurs only once or twice during a typical working day, a spare battery pack (not shown) and a battery charger (not shown) may be used to minimize system down time due to battery recharging and replacement requirements. While one battery pack is being used to power the system, the spare battery pack may be charged at any convenient location outside of the underground mine. A charger connection 51 is provided for charging purposes.

Using this method of always keeping a spare battery charged, mine personnel need only transport an eight pound battery pack underground once each week. The discharged battery in the main electronics unit may then be replaced without requiring the apparatus to be powered down for more than a few minutes. More importantly, operation of the apparatus of this invention will not be affected by the frequent power failures experienced in underground mines.

Typically, prior art type seismic or microseismic systems are large and cannot be handled by one person. One such system, as earlier discussed hereinabove, for example, consisted of ten components with a total weight of more than two hundred pounds with a battery pack weighing thirty-five pounds which is more than the entire weight of the apparatus of this invention as configured for underground operation.

In the electrical configuration of this invention, each of the electronic subassemblies are powered individually with complete electrical isolation between the individual subassemblies. This configuration allows operating several dissimilar circuit assemblies in close proximity with no interference or coupling of electrical signals between the individual circuits. In addition, by electrically isolating and limiting individual battery supplies to plus six volts DC, circuit voltages are maintained within intrinsically safe design limits for use in gassy mine environments, reducing the requirements for current limiting devices and allowing circuit designs which require very little power consumption. Through this arrangement, the apparatus of this invention is able to achieve long life battery operation using only four six volt, four ampere-hour capacity batteries.

As best shown in FIG. 2, analog signal conditioner 43 includes a detect indicator 53 which is viewable through window 34 of door 31. In addition, analog signal conditioner 43 includes a pair of control knobs 55 and 56 for controlling operation of the conditioner. Digital processor 45 includes a computer busy indicator 58 and a data display 59 which are likewise viewable through window 34 of door 31. I/0 device selector 61 and controls 62, 63 and 64 are also provided at the front of the digital processor unit 45. Red warning indicator 66 and yellow alert indicator 67 are mounted at the front of alarm indicator/transmitter unit 49 to enable viewing of these indicators through window 35 of door 31.

The electronics of central unit 19 are shown by the block diagram of FIG. 3. As shown, the microseismic emissions sensed by sensor and preamplifier unit 21 are coupled through cable 23 to main assembly (central unit) 19. More specifically, this microseismic signal input is coupled to analog signal conditioner 43. The output from analog signal conditioner 43 is coupled to digital processor 45 which provides an alarm control output to transmitter/alarm indicator controller 49. In addition, an event data output is provided on lead 70 and a ratio data output is provided on lead 71 to connectors 39 and 40, respectively, adapted to be connected with an external strip chart recorder 73. Digital processor 45 also provides an output to eight digit numerical display 59.

One output from transmitter/alarm indicator controller 49 is coupled to single frequency telemetry loop antenna 75, while other outputs are coupled to the red warning indicator 66, yellow alert indicator 67, and audible alarm horn 76. Analog signal conditioner 43, digital processor 45 and transmitter/alarm indicator controller 49 are powered by internal rechargeable battery pack 47.

The power supplies for all three of the circuit functional groups (analog conditioner 43, digital processor 45, and transmitter/alarm control 49) are completely separate and electrically isolated from each other. Since no individual power voltage exceeds plus six volts DC, intrinsic safety requirements are maintained with very little current limiting protection needed. The electrical isolation of individual power supplies eliminates signal coupling problems.

The battery power system 47 is shown in FIG. 4. As shown, the battery pack includes four individual six volt DC, four ampere-hour batteries 80, 81, 82 and 83 (preferably Gould, Inc. MP701-T type batteries). Voltages supplied to the system are provided through 0.68 ohm current limiting resistors 85, 86, 87 and 88 to prevent any short circuit condition that may present a hazard in gassy or methane mine environments. Inputs from a battery charger are protected from accidental shorting using two Motorola MR500 type silicon diodes (90-91, 92-93, 94-95, and 96-97) in a series arrangment on each battery positive terminal. Using these protective devices, shorting any or all of the input or output terminals will not produce a hazardous electrical discharge.

The individual, electrically isolated battery power supplies are important. Using this battery configuration, the entire battery pack may be transported anywhere in an underground mine without requiring the heavy, explosion proof enclosures or battery potting as is common practice. This is achieved through the use of a printed circuit board for critical electrical connections at the battery positive and negative terminals and ensures that the electrical conductors cannot be inadvertantly overlapped or shorted even if the battery pack is destroyed in a mine cave-in.

As shown in FIG. 5, sensor 25 (preferably an Automation Industries, Inc. 57A2788 lithium sulfate type pressure transducer that senses all microseismic disturbances from the earth structure equally within the frequency range 10 kilohertz to 250 kilohertz) is coupled to the earth structure (preferably using a 0.004 inch thick sheet of polyethelene plastic in physical contact with both the sensitive face of the sensor and the earth structure).

The sensor output is amplified in preamplifier 29 using wideband amplifier 100 and differential output amplifiers 101 and 102 (all of which are preferably National Semiconductor Ltd. LF351AN type JFET input operational amplifiers) and sent through preamplifier cable 23 to conditioner 43. LF351 type amplifiers operate over a wide supply voltage range of three volts DC to eighteen volts DC and require only four milliamperes of current per amplifier. This allows the use of low voltage battery supplies and minimizes required battery ampere-hour capacity.

Preamplifier cable 23 is normally a five conductor shielded type cable that may be any length up to 500 feet. The amplified differential microseismic signals, cable ground shield, and preamplifier power supply lines are within the preamplifier cable.

The wideband microseismic signals are further amplified in analog signal conditioner 43 using one LF351 amplifier 104 in a differential input mode and a second LF351 amplifier 105 in a single-ended gain mode. The wideband microseismic signals are then high pass filtered using two stages of 36 kilohertz high pass elliptical filters 106 and 107 buffered by LF351 type amplifiers 108 and 109 to compensate for signal attenuation in the high pass filters. Each high pass elliptical filter has an 18 dB per octave roll-off below 36 kilohertz to ensure that low frequency microseismic signals and cultural mining noise are removed prior to ME signal detection.

FIG. 6 is a plot of typical wideband microseismic signals recorded in an underground mine and illustrates the effectiveness of the elliptical filters utilized and the necessity for filtering to select the desired ME signals for detection and processing. FIG. 6 shows a typical wideband signal A1 prior to 36 kilohertz high pass filtering and the frequency spectrum of such signals in an underground mine environment. Signal A2 shows typically the effect of filtering on signal A1 and illustrates how well the 36 kilohertz cut-off point achieves the desired ME signal separation from mine noise. FIG. 6 also shows typically the frequency spectrum of the filtered ME signals used for failure analysis.

Signal B, as typically shown in FIG. 8, contains the desired ME pulses and are sent to an external monitoring BNC type connector on lead 110 and coupled through capacitor 111 to full wave detector and low pass filter 112. Capacitor 111 removes all DC voltage components from signal B before full wave detection is performed. The full wave detector and low pass filter 112 generates a DC voltage envelope forming signal C from signal B as typically shown in FIG. 8. The full wave detector and low pass filter combination are preferably accomplished using a National Semiconductor Ltd. LF353AN Type dual JFET input amplifier (this device contains two LF351 type amplifiers) with a capacitor in the active gain feedback loop to produce the desired low pass filtering. The low pass filter's 3 dB response must be within a range of 160 hertz to 2 kilohertz to reduce ME pulse envelope ripple for effective single pulse threshold detection.

The DC voltage envelope of signal C is then input to a variable voltage threshold detector 114 to form signal D as illustrated typically in FIG. 8. Threshold detection is preferably accomplished using a single LF351 type amplifier as a voltage comparator. Signal C is input to the LF351's negative input and a threshold reference voltage is applied to the negative input from the variable voltage reference 115. The voltage reference is variable from 0 volt to 1.0 volts to compensate for varying ME pulse amplitudes that may be encountered in a variety of mine environments and other earth type structures. Threshold adjustment is preferably accomplished using a National Semiconductor Ltd. LM385Z type 1.235 volt DC reference source and a variable resistor divider network with operator adjustment being provided by front pannel potentiometer control knob 55.

The threshold detected unipolar DC voltage ME pulse representation of signal D is then sent to the digital processor for ME event counting and processing to determine the ME pulse duration or relative pulse energy.

The DC supply voltages are provided to the analog circuits and preamplifier assembly of signal conditioner 43 through two individual, electrically isolated plus six volt DC battery supplies (see FIG. 4) that are coupled into the analog signal conditioner's printed circuit board assembly and then connected internally to produce a +6 and −6 volt DC supply configuration. The internally configured +6 and −6 volt DC supply is then routed back out of the analog signal conditioner to the preamplifier.

Using the arrangement of configuring the +6 and −6 volt DC power supply, the intrinsic safety requirement that circuit voltages of more than 6 volts DC are not accessible in a methane environment is maintained since removal of the analog signal conditioner assembly also removes the +6 and −6 volt supply configuration. Secondly, removal of the analog signal conditioner assembly automatically disconnects the +6 and −6 volt DC supply to the preamplifier cable and preamplifier. Exposed voltages in the preamplifier cable are prevented by configuring the preamplifier cable connectors such that live voltages only appear at female connector terminals.

A low power digital microcomputer ($\mu$C) 117 (see FIG. 7), designed to compute ME ratio data, display user selectable data parameters, convert digital numeric data to an equivalent DC voltage for strip chart recording, analyze high stress and failure warning conditions, and automatically control warning indicators, is utilized in digital processor 45.

As shown in FIG. 7, signal D is input to digital processor 45 through optical isolator 120 (preferably a Hewlett Packard 6N139 type optical isolator), in order to maintain electrical isolation between analog signal conditioner 43 and digital processor 45. In the digital processor, signal D forms the clock input to a 10-decade ME event counter 122 through 2-input NAND gate 124. Microcomputer 117 uses one input to gate 124 to disable all counting functions during data read operations at the termination of each one minute data sample period.

Signal D is used in conjunction with the 2-input NAND gate 126 and crystal controlled 279.62 kilohertz square wave pulse oscillator 128 to form signal E as shown in FIG. 8. Gating the precisely timed reference pulses of the 279.62 kilohertz oscillator 128 with the ME event pulse signal D to form the pulse burst of signal E, the number of reference pulses contained within each pulse burst of signal E is in direct proportion to the ME pulse duration relative to the DC voltage reference level (threshold level) used for the ME event pulse detection. The reference pulses of signal E forms the clock input to 10-decade energy (pulse duration) counter 130.

The 10-decade event and energy counters 122 and 130 are configured using two Motorola Company MC14534 CMOS type real time 5-decade counters cascaded in series to produce the full 10-decade counter capability. The MC14534 counters are particularly well suited for use with microcomputer 117 since they provide a sequential output of each decade's numeric value in a 4-bit binary coded format. Event counter 122 accumulates individual ME event counts over a regularly timed one minute data sample period. Likewise, the energy counter accumulates the number of associated ME pulse duration reference pulse counts over the one minute data sample period. The energy count thus represents the total time duration over which ME event amplitudes were equal to or greater than the DC threshold level. Dividing the energy count by the event count forms the average energy count or average time duration per ME pulse (termed ratio value) detected during a one minute data sample period.

Operation of microcomputer 117 (preferably an NEC 80C35 CMOS type 8-bit single-chip microcomputer) is achieved by using program memory 132 (preferably two Intersil 6654 CMOS type 512×8-bit ultraviolet, electrically programmable, read only memories (UV EPROM's)). In addition, an I/0 device selector 61 (preferably a Motorola Company MC14519 CMOS type 4-bit and/or selector and a Motorola Company MC14515 CMOS type 4-to-16 line decoder) is also utilized. As shown, microprocessor 117 derives all operation instructions from program memory 132 via an 8-bit data I/0 bus 134 and two chip select lines on the µC's number 2 output control port 136. Data input and output between the µC and all other peripherial devices are transferred over the data I/0 bus 134 under the control of the µC via the number 2 output control port 136 and the I/0 device selector 61. Microcomputer 117 then simply selects which device data is to be sent to or received from by addressing the particular device via the I/0 device selector 61.

To conserve operating power, microcomputer 117 is maintained in a halt mode until the end of each one minute data sample period when a one minute (0.0167 hertz) timing signal source (from frequency divider 138) activates the µC's interrupt input control to begin data read, analysis, and all other programmed functions. The entire µC program is executed in approximately 0.6 seconds, leaving the µC in the lower power halt mode during 99% of the data sample period. To inform the operator of the working state, or condition, of the µC, a yellow light emitting diode indicator 58 is energized using one of the number 1 output port 140 control lines of the µC as soon as processing begins. The indicator is then de-energized when the µC returns to the low power halt mode.

Data from event counter 122 is read into the µC by first disabling counting functions via gate 124 and then selecting the least significant 5-decade counter using the I/0 device selector 61. The µC then subsequently accesses each of the five digit values using three of the number 2 output port lines to place the output from the counter on the data I/0 bus, scans through each digit value, and then resets the counter to zero. The most significant 15-digit counter is then selected and the read process is repeated to complete the full 10-decade event counter data read.

Once all data has been read and stored in the µC's internal storage registers, the µC divides the energy data by the event data to generate the ratio valuer for the current data sample period. The ratio data and energy data are evaluated to determine if a failure warning or high stress condition has developed. If any of the particular alarm conditions are detected, the µC causes the telemetry transmitter to transmit the specific alarm identification code and activates the appropriate alarm indicators via its individual number 1 output port 140 control lines.

The µC then checks its user flag inputs to see what current data parameter (event count or ratio value) the instrument operator has selected for display using the front panel control inputs 62-64. The specified data parameter is sent to the 8-digit numeric display by accessing the display decoder/driver 142 using the I/0 device selector 61 and transferring the data, one digit at a time, over the 8-bit data I/0 bus 134. Numeric display is preferably accomplished using two Intersil 7211 CMOS Type 4-digit liquid crystal display controllers cascaded in series and a AND FE1001D type 8-digit numeric liquid crystal display.

The last function performed by the µC before returning to the low power halt mode is to convert the current event count and ratio value data to analog DC voltages for output to a strip chart recorder. This is accomplished by first normalizing the current event count and ratio value data to the strip chart recorder's full scale input level and sending the normalized data to their respective digital-to-analog converters 144 and 145. Each digital-to-analog converter is first accessed through the I/0 device selector 61 and then the specific data are transferred to them via the 8-bit data I/0 bus 134. Each digital-to-analog converter preferably consists of a single Analog Devices, Inc. 7524 CMOS type 8-bit digital-to-analog converter.

A low battery detector 147 is also incorporated in the digital processor to alert instrument operators to low battery conditions that may adversely affect data. Low battery detector 147 preferably uses an Intersil 8212 CMOS type micropower voltage detector to directly sense the digital processor's +6 volt DC battery supply voltage. Whenever the battery voltage drops to +5.8 volts DC, the low battery detector's output changes its voltage state and causes the 8-digit numeric display's decimal points to flash on and off at a 1.0 hertz rate.

The entire digital processor subassembly requires less than 10 milliamperes of current during normal operation. This very low current capability is due to the exclusive use of CMOS type integrated circuit components in the processor's design.

All functions performed by the digital processor's microcomputer are under the direct control of the program stored in the 1024×8-bit program memory 132. The program memory is capable of storing 1,024 individual 8-bit microcomputer instruction codes and is easily upgraded or modified using the ultraviolet erasing and electrical programming characteristics of the UV EPROM's used. A better understanding of how digital processor 45 is caused to perform the desired ME data sampling, analysis, display and alarm control functions is achieved by considering FIGS. 9, 10 and 11.

FIG. 9 shows the overall microcomputer program functions as they are performed in sequential order. Whenever power is applied to the system, the µC automatically vectors to the power on initialization routine which clears all internal data registers, displays all 8's on the 8-digit numeric display, causes the strip chart recorder outputs to go to 0.0 volts DC, resets all alarm indicators and internal alarm status flags, and then enters the low power halt mode. The µC will remain in the halt mode until the one minute data sample period timer interrupt signal is received.

When the one minute interrupt is detected, the µC begins the processing functions by first checking the status of all front panel control inputs and then reads ME event count and energy data into internal storage registers for further processing. Since the ratio value is the most sensitive indicator of imminent structural failure, the µC next computes the ratio value and immediately analyzes the ratio to see if it has reached an alarm value. Using the current energy data and past energy data flags, the µC analyzes whether a hazardous energy trend has developed.

Once the analysis is complete, the µC displays the current data on the 8-digit numeric display according to instructions provided through the front panel display selector controls. If the front panel strip chart recorder calibration controls have not been activated, the µC sends the recorder full scale normalized event and ratio data to the digital-to-analog converters for output to a strip chart recorder. If the recorder zero or full scale front panel controls have been activated, the μC will send the appropriate calibration data to both digital-to-analog converters instead of the current data values.

The last function performed by the μC before entering the halt mode is to check if the alarm status flags have been altered by the ratio or energy trend analysis. If any of the alarms have been set positive true, the μC issues the appropriate control command to the alarm indicator subassembly.

The ratio and energy trend analysis is particularly important. Consideration of FIGS. 10 and 11 provide a more detailed illustration of how this feature is accomplished through the μC's programming. FIG. 10 shows the detailed program structure used to analyze the ratio value and energy trends for the development of abnormally high structural stress and imminent structural failure.

The ratio value is computed by dividing the energy count data by the event count data accumulated during the current one minute data sample period. A better example of the character of the ratio data obtained by this method is shown in FIG. 13.

Data shown in FIG. 13 was obtained from an underground coal mine during a period when a relatively small structural failure occurred and is representative of the typical character of such data. The energy count data (FIG. 13a) and event count data (FIG. 13b) show amplitude excursions typically associated with normal underground mining operations. In such cases, the computed ratio value normally remains within values that range from 50 to 500. If structural failure is imminent, the ratio value is increased dramatically during only one or two of the one minute sample periods (see FIG. 13c), typically reaching values over one or more orders of magnitude greater than the normal reading and often to 500 and less than 1500. During the period shown in FIG. 13, the structural failure occurred thirteen minutes after the anomalous ratio value was observed. As shown in FIG. 13, using a ratio trigger value of 1000, imminent structural failure can be predicted.

Once the μC computes the ratio value, it is compared with a failure alarm reference value of 1000. If the ratio value is equal to or greater than 1000, the μC sets the failure warning flag positive true. If the ratio value is less than 1000, the μC proceeds directly to the energy trend analysis portion of the program. Although a ratio alarm reference value of 1000 is used in this system, the reference value may change for varying geologic environments. All constants and reference values used in the program may be modified through reprogramming of the UV EPROM's.

The μC then begins the energy trend analysis by first checking to see if a high trend flag had been set previously. This initial step is performed in the trend analysis since it is assumed that once a high trend or high stress condition has been detected, the high stress condition will continue until some form of structural failure causes the energy data to rapidly decrease. In this program, if a high trend has been previously detected and the high trend flag set, the high trend analysis is then ignored or bypassed and data are only analyzed for the subsequent occurrence of a low trend or failure condition.

If the high trend flag has not been previously set, the current energy data value is checked to see if it is equal to or greater than a high energy trend reference value of six million energy counts. If the high energy trend check is negative, the program resets, or zero's, the high energy trend counter and exits the high energy trend analysis routine. If the high trend check is positive, the program increments the high energy trend counter and checks to see if the current high energy value represents the fifth consecutive occurrence of a high energy value. The energy trend counter is used to verify the developement of a high energy trend by applying the requirement for five consecutive occurrences of a high energy data value as a criteria for a high energy trend. This prevents triggering of the high stress caution alarms by extraneous or anomalous energy data values.

If the current energy data value does not represent the fifth consecutive occurrence of a high energy value, the program exits the energy trend analysis routine. If the current energy data value does represent the fifth consecutive occurrence of a high energy data value, the program sets the high trend or yellow caution alarm flag and exits the energy trend analysis routine. A better understanding of how this high energy trend analysis program works is achieved by considering the energy data plot shown in FIG. 12 obtained in an underground coal mine during a period of high stress build up and a subsequent structural failure.

The energy trend routine begins by checking energy data for values which equal or exceed the high trend reference level of six million energy counts per minute. Starting at approximately 0841 hours, the energy data values began to exceed the high trend reference level causing the high trend counter to be incremented during the next five consecutive sample periods. After occurrence of the fifth consecutive sample period having a high energy data value, the program sets the caution alarm flag and causes the yellow caution indicator and horn to be activated. The program then begins looking for the subsequent occurrence of a failure related low energy trend.

Again referring to FIG. 10, once the high trend flag is set, the program gets a positive response to the high trend flag check and proceeds directly to the low trend analysis portion of the energy trend analysis routine. The program then checks to see if the current energy data value is equal to or less than the low energy trend reference value of two million. If the check yields a negative response, the the program resets, or zero's, the low trend counter and exits the energy trend analysis routine. If the check is positive true, the program increments the low trend counter and checks to see if the current low energy value represents the third consecutive occurrence. The program uses the criteria of three consecutive low energy data values as a requirement to establish a low energy trend.

If the current low energy data value does not represent the third consecutive occurrence, the program exits the low energy trend analysis routine. If the current low energy data value does represent the third consecutive occurrence, the program sets the red failure warning flag and resets both the high trend counter and low trend counter to zero. This resets the analysis routine to begin looking for another high trend condition. The low trend analysis procedure is also illustrated in FIG. 12.

The high energy data level shown in FIG. 12 continued until approximately 0916 hours and then decreased below the low trend reference level of two million energy counts per minute. Using the program, the continuation of the low energy data values during the next three minute period would be detected as three consecutive low energy trend values and cause the red failure warning flag to be set, activating the failure warning indicators. As indicated in FIG. 12, the mine structural failure occurred approximately ten minutes after the system would have activated the warning alarm.

A better understanding of how the program controls the high stres caution and failure warning alarms is achieved by considering FIG. 11. The program routine to determine alarm status begins by first checking to see if the red failure warning flag has been set either by the ratio analysis routine or the low energy trend analysis routine. If the red failure warning flag has been set positively true, the program automatically disables the yellow high stress caution alarm (if it had been activated previously) and immediately activates the red failure warning alarm indicators before exiting from the alarm status routine.

If the red warning flag has not been set, resulting in a negative resonse to the warning flag check, the program then proceeds to check if the yellow caution flag had been set previously by the high energy trend analysis routine. If the yellow caution flag had not been set, the program exits from the alarm status routine. If the yellow caution flag is set positive true, the program then disables the red failure warning alarm (if it had been activated previously) and immediately activates the yellow high stress caution alarm indicators before exiting the alarm status routine.

Typically, energy is derived by computing its absolute value from a measurement of the peak amplitude of seismic or microseismic signals and summing the total computed energy values over a specified time period. The apparatus of this invention for determining energy, on the other hand, is based upon a measurement of the desired signal's duration relative to a reference amplitude voltage level. Using this method of energy determination, detection of changes in energy due to both increases in peak signal amplitude and increases in pulse duration not accompanied by a corresponding change in peak signal amplitude can be made.

The alarm indicator subassembly is shown in FIG. 14. Digital processor control signals are input to alarm indicator subassembly 49 through optical isolators 150, 151, 152, 153 and 154 (preferably Hewlett Packard 6N139 type optical isolators) to maintain electrical isolation between the digital processor's +6 volt DC battery supply and the alarm indicator's +6 volt DC battery supply. The entire alarm indicator subassembly is powered from a single +6 volt DC 4.0 ampere-hour capacity battery 83.

Digital processor serial transmitter data are input through the optical isolator 150 to transmitter pulse width control circuit 156 (preferably a Motorola Company MC14538 CMOS type dual one-shot multivibrator). The pulse width control receives a 2.6 kilohertz square wave pulse reference oscillator signal from frequency divider 158 and 332.8 kilohertz oscillator 160 to provide a 100 millisecond long pulse train whenever a logic one serial data bit is received from the digital processor. The 2.6 kilohertz modulated pulse train is then sent to the full wave transmitter bridge circuit 162 that preferably uses four Intersil 5201 type VMOS transistors to drive a 25-turn loop antenna 164 at a frequency of 1.3 kilohertz.

All frequency references used in the alarm indicator subassembly are derived from crystal controlled 332.8 kilohertz square wave pulse oscillator 160. The various secondary pulse frequency references of 0.063 hertz, 1.27 hertz, and 2.6 kilohertz are produced from the binary divider 158 outputs (using two Motorola Company MC14040 CMOS type 12-stage binary dividers cascaded in a series).

The yellow high stress caution alarm enable control is provided by the digital processor as a positive logic pulse through the optical isolator 151. The caution enable pulse is inverted by the optical isolator and clocks a negative edge triggered flip-flop 166 (preferably a Motorola Company MC14013 CMOS D-type flip-flop). The flip-flop's positive going output gates a 0.063 hertz square wave frequency reference through 2-input AND gate 168 to the yellow caution indicator driver 170. The indicator driver turns on the yellow caution lamp 67 preferably using an Intersil 5201 VMOS type transistor during the positive half cycle of the 0.063 hertz blink rate frequency control reference.

The caution enable flip-flop 166 output also forms one of the alarm horn control inputs via 2-input AND gate 172. The 0.063 hertz square wave output signal of gate 172 forms one of the inputs to 2-input OR gate 174 that phase inverts the 0.063 hertz control signal and turns on alarm horn 76. Horn driver 176 preferably uses an Intersil 5201 VMOS type transistor to turn on the horn during the positive half cycle of the inverted 0.063 hertz frequency control reference. The inverted control signal to the horn prevents the alarm indicator and horn from turning on at the same time, reducing the instantaneous current drain on the +6 volt DC battery supply.

Control of the red failure alarm indicator 66 is accomplished in a similar manner as the yellow caution indicator 67 by the digital processor providing an enable control pulse through optical isolator 154 to a D-type flip-flop 178. The flip-flop output gates the failure indicator's 1.27 hertz square wave pulse frequency reference through 2-input AND gate 180 to the failure indicator driver 182. The failure indicator's red lamp 66 is also turned on during the positive half cycle of the 1.27 hertz frequency control reference using an Intersil 5201 VMOS type transistor driver 182.

The control output of failure alarm flip-flop 178 gates the 1.27 hertz frequency control reference to alarm horn 76 via 2-input AND gate 184. The 1.27 hertz frequency control reference is inverted going through the 2-input OR gate 174 to drive, or turn on, the alarm horn during the red failure indicator's alternate off cycle.

Individual indicators and the alarm horn may be reset, or turned off, by the digital processor by sending a positive control pulse through the caution reset input optical isolator 152 or the failure warning reset input optical isolator 153. A caution indicator reset control is gated to the reset input of caution flip-flop 166 using 2-input NAND gate 186. Once a reset input is coupled to flip-flop 166, both the yellow indicator and horn control signals are gated off by gates 168 and 172. Similarly, a reset control pulse to the failure warning reset optical isolator 153 resets the failure indicator control flip-flop 178 using 2-input NAND gate 188. The output from flip-flop 178 then gates off both the horn and the red failure warning lamp by gates 184 and 180, respectively.

One input to gates 186 and 188 is tied to a positive high logic level using a pull-up resistor 190 connected to the +6 volt supply to allow use of the gates in an inverting mode and permit manual reset of all indicators. A manual alarm reset pushbutton control 192 pulls the normally high inputs on gates 186 and 188 to a low logic level. This simultaneously applies a reset pulse to both the caution control flip-flop 166 and the failure warning flip-flop 178 turning off any alarm that may have already been activated by the digital processor.

In operation, to achieve the desired measurement of high frequency microseismic emissions (ME), a pressure sensitive wideband transducer is used to sense and translate ME signals to equivalent electrical signals. The ME signals are then amplified and filtered to remove unwanted cultural noise and low frequency microseismic or siesmic signals. A full wave detector and low pass filter are then used to convert the ME signals to DC voltage pulses allowing detection of individual events and their pulse duration relative to a reference amplitude level.

Event count and pulse duration are then accomplished using a threshold detector that changes or switches its output voltage state whenever the input voltage equals or exceeds the presettable voltage reference level. Each change of the threshold detector's output voltage state represents the detection of an individual ME event. The time duration of the change in the threshold detector's output voltage state indicates how long the ME event's amplitude remained above the reference voltage level and represents both the relative pulse duration of the individual ME events and the relative amplitude or energy of the ME event.

The threshold detector's output provides a clock input to a digital counter for the event count. The event pulse also provides a gate control for counting a fixed oscillator that provides a time base for pulse duration or relative ME pulse energy measurements. The event counting and pulse timing oscillator (energy) counting are performed simultaneously and accumulated over a fixed one minute time period. At the end of each one minute period (data sample period), a microcomputer reads the total event count and pulse timing oscillator count accumulated over the data sample period.

The microcomputer then calculates the average ME pulse duration (ratio) by dividing the total pulse timing oscillator (energy) count by the total event count and stores all three data values internally for evaluation and display. Data display is accomplished by the microcomputer scaling and sending the total event count and ratio data (average ME pulse duration) to digital-to-analog converters for output to strip chart type recorders. The microcomputer also sends one of the two data parameters (event or ratio) selected by a front panel control to a liquid crystal type numeric display for observation or manual recording.

Automatic energy trend and ratio failure prediction analysis are then performed by the microcomputer using energy count and ratio data. The microcomputer analyzes structural failure using two different, redundant methods of failure prediction concurrently. The $\mu C$ uses the energy data to determine anomalous energy trends that are typically associated with relatively large scale or massive structural failures. Ratio data, on the other hand, is used by the $\mu C$ to detect sudden, anomalous increases in the average ME pulse duration (ratio value) that indicates structural failure is imminent and always preceeds both large and small structural failures.

To perform the energy trend analysis, the $\mu C$ first checks the energy data after each one minute sample period to determine if the energy data is equal to or greater than a constant high trend reference level permanently stored in the $\mu C$. This high trend reference level is chosen to indicate when changes in the mechanical loading of the earth structure are occurring at an abnormally high rate. If the energy data is equal or greater than the high trend reference level for five consecutive minutes, the $\mu C$ activates a high stress caution alarm to warn nearby personnel that a hazardous condition is developing.

Once the $\mu C$ detects a high trend condition and activates the oppropriate alarms, it begins analyzing the energy data for a subsequent, sudden decrease in the energy data or the occurrance of a subsequent low trend condition. To determine when a low trend is developing in the energy data, a constant low trend reference level is permanently stored in the $\mu C$ for comparison with the energy data. The low trend criteria assumes that, once a high trend is established, the high level of structural stress that has developed can only be relieved through some form of structural failure. The $\mu C$ detects this by checking the energy data to see when it begins to rapidly decrese. The low trend is detected by the $\mu C$ when the energy data is equal to or less than the low trend reference level for three consecutive minutes. When the low trend condition is satisfied, the $\mu C$ activates the failure warning alarms and begins looking for another high trend condition to develop.

Analysis of the ratio data for failure prediction is much simpler than the energy trend method and provides only a direct indication of when structural failure is immenent. For example, the ratio method does not generate a high stress caution alarm as does the energy trend analysis. Typically, ratio data will always be below a value of 500 due to the basic ME pulse characteristics except when structural failure is developing. Whenever failure begins to develop, the average ME pulse duration will suddenly increase to a value normally greater than 1000, and, in most cases, several orders of magnitude greater than the normal value. The $\mu C$ is, then, programmed to check each calculated ratio value to see if it equals or exceeds the stored reference value of 1000. Whenever the ratio value exceeds the reference value, the $\mu C$ activates the failure warning alarm to warn nearby personnel of the immenent hazard. The $\mu C$ gives priorty to the ratio failure analysis over the energy trend analysis even though the $\mu C$ continues to evaluate energy trend as described above.

The $\mu C$ also directly controls all the warning indicators via one of its 8-bit control ports. Whenever any of the alarm conditions are detected, the $\mu C$ causes a voltage change on the appropriate port line to activate alarm indicator lamps and horn in the system's indicator subassembly. One of the port lines is dedicated to serial telemetry transmission of the caution and failure warning alarm codes to a remote personnel alarm pager. Both the transmitter control circuits and loop antenna are contained within the indicator subassembly.

Control of alarm indicators is accomplished by the $\mu C$ triggering individual alarm enable flip-flop logic gates that cause the individual alarms to turn on. The $\mu C$ can then turn off individual alarms by applying a reset voltage to the flip-flop reset input. To avoid turning alarms off before personnel have an opportunity to acknowledge the hazard warning, the $\mu C$ is programmed to turn off or reset the failure warning alarm only upon a system power up or initialization condition. Once activated by the $\mu C$, the failure alarm can only be turned off manually using an external alarm reset control. Since a failure condition has a greater priority over a high stress caution condition, the $\mu C$ automatically resets or turns off the caution alarm whenever a failure condition is detected and turns on the failure alarm. The caution alarm may also be reset or turned off manually using the external alarm reset control.

To aid personnel in easily recognizing the two alarm conditions, different colored indicator lamps and on/off blink rates are used to control the alarms. A yellow or amber indicator that blinks at a 0.063 hertz rate is used for the caution alarm, and a red indicator that blinks at a 1.27 hertz rate is used for the failure warning alarm. The internal horn is activated in conjunction with and at the same rate as the individual alarm indicator lamps.

As can be appreciated from the foregoing, the apparatus of this invention provides an improved device that is capable of reliably indicating imminent failure of earth structures.

What is claimed is:

1. A device for failure prediction of earth structures, said device comprising:
sensing means for sensing predetermined microseismic emissions of a selected earth structure and responsive thereto providing electrical output signals indicative of predicted failure of said earth structure;
processing means including computer means for receiving said electrical output signals from said sensing means;
control means connected with said computer means for causing said computer means, responsive to receipt of said electrical output signals from said sensing means to provide an output signal from said processing means indicative of said predicted earth structure failure; and
indicating means connected with said processing means to receive said output signal from said processing means and responsive thereto automatically providing an indication of said predicted structure failure.

2. The device of claim 1 wherein said processing means includes logic gate means connected with said sensing means, and counter means connected with said gate means and said computer means.

3. The device of claim 1 wherein said control means includes read only programmable memory means connected with said computer means.

4. The device of claim 1 wherein said system includes battery means and electrical isolation means connecting said battery means with at least said processing means and said indicating means.

5. The device of claim 4 wherein said electrical isolation means includes optical isolators.

6. The device of claim 4 wherein said battery means includes a plurality of six volt batteries with each of said batteries being connected with a different one of said processing means and said indicating means.

7. The device of claim 4 wherein said processing means includes battery low power detecting means for indicating low battery power.

8. The device of claim 1 wherein said control means causes said computer means to be active for less than about one percent of available time to thereby enhance power economy.

9. The device of claim 1 wherein said system includes logic means connecting said indicating means to said processing means.

10. The device of claim 9 wherein said logic means includes flip-flop means connected with said processing and gate means connected with said indicator means.

11. The device of claim 1 wherein said device includes enclosure means for receiving said processing means said connector means and said indicating means, said enclosure means providing a portable unit.

12. The device of claim 1 wherein said sensing means is adapted to be positioned contiguous to a selected portion of an underground mine, and wherein said device automatically predicts failure of said selected portion of said underground mine.

13. The device of claim 12 wherein said selected portion is the roof of an underground mine, and wherein said device predicts roof fall.

14. A device for failure prediction of earth structures, said device comprising:
sensing means for sensing preselected characteristics of a selected earth structure and responsive thereto providing electrical output signals indicative of predicted failure of said earth structure;
processing means for receiving said electrical output signals from said sensing means and, responsive to receipt of said electrical output signals from said sensing means, providing an output signal from said processing means indicative of said predicted earth structure failure;
indicating means connected with said processing means to receive said output signal from said processing means and responsive thereto providing an indication of said predicted structure failure;
battery means; and
electrical isolation means connecting said battery means with said processing means and said indicating means to electrically isolate said processing means and said indicating means from one another through said battery means.

15. The device of claim 14 wherein said battery means provides a six volt power source as the sole power source to said device.

16. The system of claim 15 wherein said connection of said battery means with said processing means and said indicating means is through optical isolating means.

17. A device for failure prediction of a selected earth structure by determining variations in mechanical loading through monitoring of microseismic emissions, said device comprising:
transducer means adapted to be positioned contiguous to a selected earth structure for determining variations in mechanical loading therein, said tranducer means producing an electrical output signal indicative of microseismic emissions greater than about 36 KHz, said microseismic emmissions being indicative of predicted earth structure failure;
signal conditioning means connected with said transducer means for conditioning electrical output signals from said transducer means and providing pulse output signals indicative of said received electrical output signals from said transducer means;
gate means connected with said signal conditioning means to receive and pass said pulse output signals from said signal conditioning means;
counter means connected with said gate means and responsive to said pulse output signals therefrom causing event counts and energy counts to be produced;
computer means connected with said counter means to receive said event counts and said energy counts therefrom;
control means connected with said computer means for causing said computer means, responsive to receipt of said event counts and energy counts, to provide an output signal from said computer means indicative of said predicted earth structure failure; and indicating means connected with said computer means to receive said output signal from said computer means and responsive thereto automatically providing an indication of said predicted earth structure failure.

18. The device of claim 17 wherein said counter means includes first and second ten decade counters, and wherein said gate means includes a first NAND gate connected with said first ten decade counter and a second NAND gate connected between said first NAND gate and said second decade counter.

19. The device of claim 18 wherein said device includes frequency dividing means and oscillator means connected with said second NAND gate and said frequency divider means, said frequency divider means being connected with said computer means.

20. The device of claim 19 wherein said oscillator has a frequency of 279.62 kilohertz.

21. The device of claim 19 wherein said control means is a programmable memory means connected with said computer means.

22. The device of claim 21 wherein said device includes selector means connected with said computer means.

23. The device of claim 21 wherein said device includes first and second digital-to-analog converters connected with said computer means, said converters being adapted to be connected with recorder means.

24. The device of claim 17 wherein said device includes battery means and electrical isolation means connecting said battery means with at least said signal controlling means and said computer means.

25. The device of claim 24 wherein said battery means provides a six volt DC power source, and wherein said electrical isolation means includes means for separately connecting said battery means to said signal conditioning means and said computer means.

26. The device of claim 24 wherein said electrical indicator means includes optical isolation means for connecting said conditioning means and said computer means.

27. The device of claim 24 wherein said device includes low battery detecting and indicating means connected with said computer means.

28. The device of claim 17 wherein said control means causes said output signal indicative of predicted failure to occur if the ratio of said energy to said event count is equal to a value of at least one or more orders of magnitude greater than normal.

29. The device of claim 17 wherein said control means causes said output signal indicative of predicted failure to occur if the ratio of said energy to said event count is equal to a value above 500 and below 1500.

30. The device of claim 17 wherein said control means causes said output signal indicative of predicted failure to occur if the ratio of said energy to said event count is equal to a value of at least 1000.

31. The device of claim 17 wherein said control means causes said output signal indicative of predicted failure to occur if an energy count of at least $6 \times 10^6$ is sensed over a first predetermined period followed by a decreased energy count of about $2 \times 10^6$ over a second predetermined time period less than said first predetermined time period.

32. The device of claim 17 wherein said device has a power consumption of less than about ten milliamperes of current during normal operation.

33. The device of claim 17 wherein said device includes optical isolation means connected between said computer means and said indicating means.

34. The device of claim 17 wherein indicating means includes visual and audible means, flip-flop means connected with said computer means, and gate means connected with said visual and audible means.

* * * * *